US011978599B2

(12) United States Patent
Syu

(10) Patent No.: US 11,978,599 B2
(45) Date of Patent: May 7, 2024

(54) KEY STRUCTURE

(71) Applicant: Cooltek Inc., Taipei (TW)

(72) Inventor: Kai-Lin Syu, Taipei (TW)

(73) Assignee: COOLTEK INC., Taipei (TW)

( * ) Notice: Subject to any disclaimer, the term of this patent is extended or adjusted under 35 U.S.C. 154(b) by 19 days.

(21) Appl. No.: 18/081,006

(22) Filed: Dec. 14, 2022

(65) Prior Publication Data

US 2023/0223216 A1 Jul. 13, 2023

(30) Foreign Application Priority Data

Jan. 13, 2022 (TW) ................................ 111101412

(51) Int. Cl.
*H01H 13/7065* (2006.01)
*H01H 3/12* (2006.01)

(52) U.S. Cl.
CPC ........ *H01H 13/7065* (2013.01); *H01H 3/125* (2013.01)

(58) Field of Classification Search
CPC .............. H01H 13/7065; H01H 3/125; H01H 2233/03; H01H 3/12; H01H 13/023; H01H 13/14; H01H 13/70; H01H 13/705; H01H 13/83; H01H 2215/004; H01H 2215/012; H01H 2219/014; H01H 2219/018; H01H 2219/022; H01H 2219/036; H01H 2221/044; H01H 2221/07; H01H 2227/022
See application file for complete search history.

(56) References Cited

U.S. PATENT DOCUMENTS 10,714,282 B2 * 7/2020 Izawa .................... H01H 11/00
10,915,181 B2 * 2/2021 Izawa ...................... H01H 9/22
11,189,441 B2 * 11/2021 Izawa .................. H01H 13/702
11,410,822 B2 * 8/2022 Izawa .................. H01H 13/702

FOREIGN PATENT DOCUMENTS

CN 108666162 B 3/2020
TW M415348 U 11/2011
TW M511075 U 10/2015
TW I510968 B 12/2015
TW I515610 B 1/2016
TW I632572 B 8/2018
TW I640027 B 11/2018
TW I648656 B 1/2019

* cited by examiner

*Primary Examiner* — Lheiren Mae A Caroc
(74) *Attorney, Agent, or Firm* — Muncy, Geissler, Olds & Lowe, P.C.

(57) ABSTRACT

A key structure is stacked on a display panel. The key structure includes a trigger plate, a frame, at least an elastic triggering member, and at least a key. The trigger plate is formed with at least a hollow area for the display panel to partially expose and a solid area. The frame is disposed on the trigger plate and is formed with at least an opening opposite the hollow area. The key includes a key cap and a scissor member connected to the key cap, wherein the key cap has a cap body which is located in the opening and helps directly observing the hollow area and at least two skirts which extend from sides of the cap body and are covered by the frame.

9 Claims, 6 Drawing Sheets

KEY STRUCTURE

FIELD OF THE INVENTION

The invention relates to a key structure, and more particularly, to a key structure implemented with a display panel.

BACKGROUND OF THE INVENTION

Scissor members have been commonly used in key structures, such as Taiwan Patents No. TWI648656, TWI510968, TWI640027, TWI632572, TWM415348, and Chinese Patent No. CN108666162 B. Two ends of conventional scissor structure are respectively fixed at a key cap and a base plate. The base plate is necessary, and a part for hooking the scissor member needs to be formed on the base plate. Since the base plate and the part formed on the base plate need to be provided, the key structure cannot be entirely thinned, and cannot be implemented with a short stroke.

The key structure implemented with the display panel is as disclosed in Taiwan Patents No. TWM511075 and TWI515610. Taiwan Patent No. TWM511075 uses the conventional scissor member structure to support the key cap, and the derivation problem is the same as that in the previous paragraph. The base plate makes the overall key structure unable to be thin, and it is impossible for the conventional scissor member structure to be implemented in a short stroke because of the part on the base plate for connection. In addition, Taiwan Patent No. TWM511075 is implemented in a conventional scissor member structure, resulting in a limited visible area of the key cap. In addition, Taiwan Patent No. TWI515610 is not implemented as a scissor member structure, and the overall structure is relatively complex and cannot be thin.

SUMMARY OF THE INVENTION

The main object of the invention is to solve the problem that a key structure conventionally implemented with a display panel is not entirely thinned.

A secondary object of the invention is to solve the problem that size of visible area of key structure conventionally implemented with a display panel is limited by structure of scissor members.

In order to achieve the above-mentioned object, the invention provides a key structure, stacked on a display panel, including a trigger plate, a frame, at least one elastic triggering member, a base, and at least one key. The trigger plate is formed with at least one hollow area and a solid area connected with the at least one hollow area. The at least one hollow area exposes parts of the display panel. The trigger plate includes at least one triggering circuit in the solid area. The frame is provided on the trigger plate and formed with at least one opening corresponding to the at least one hollow area. The at least one elastic triggering member is provided on the solid area of the trigger plate. When the at least one elastic triggering member is pressed, the at least one triggering circuit generates an electrical signal. The base is formed with at least one accommodating space and at least two protruding walls provided on two opposite sides of the at least one accommodating space. The at least one key operates in the at least one accommodating space. The at least one key includes a key cap pressing the at least one elastic triggering member and a scissor member connected to the key cap. The key cap includes a cap body located in the at least one opening and at least two skirts extending from sides of the cap body and covered by the frame. The at least one hollow area is directly observed through the cap body. The scissor member includes two supports. Each of the two supports includes a fixed end fixed to one of the at least two skirts and a movable end which is not fixed and is movable on the at least two protruding walls. The movable end of each of the two supports moves when the scissor member is compressed by the key cap.

In one embodiment, each of the at least two skirts is formed with at least one snap hook coupling the fixed end of each of the two supports.

In one embodiment, each of the at least two skirts is formed with at least one auxiliary limiting block, the at least one auxiliary limiting block and the at least one snap hook limits disengagement of the fixed end.

In one embodiment, one of the at least two skirts is formed with a pressing plate pressing the at least one elastic triggering member.

In one embodiment, the movable end of each of the two supports is in a circular arc shape.

In one embodiment, the key structure includes a supporting arm provided in the at least one accommodating space, and when the supporting arm contacts the key cap, the supporting arm provides a resetting force.

In one embodiment, the supporting arm and the at least one elastic triggering member are respectively located at two opposite sides of the at least one accommodating space.

In one embodiment, the supporting arm is integrally formed with the base.

In one embodiment, the base is formed with at least two stoppers provided on two opposing inner walls of the at least one accommodating space, and the at least two stoppers restrict the key cap from being separated from the at least one accommodating space.

According to the foregoing embodiments of the invention, the following features are provided in comparison with the conventional solution: The movable end of the scissor member of the invention shortens triggering stroke, and the mounting base plate fixing the conventional scissor member in the conventional structure is omitted. A significant distance difference between the key cap and the display panel is prevented. Visual impact of patterns displayed on the display panel through the key cap is prevented to be affected. In addition, operating with a short triggering stroke makes the overall key structure thinner. Furthermore, the key structure of the invention is identified by image displayed on the display panel. The fixed end of the scissor member of the invention is provided on the skirt of the key cap, thus the whole of the scissor member is out of projection range of the cap body of the key cap, and does not affect the visual range of the cap body, thereby providing a larger visual range than that of the conventional solution.

DETAILED DESCRIPTION OF THE PREFERRED EMBODIMENTS

The detailed description and technical contents of the invention are described with reference to the drawings as follows.

Figure 1:
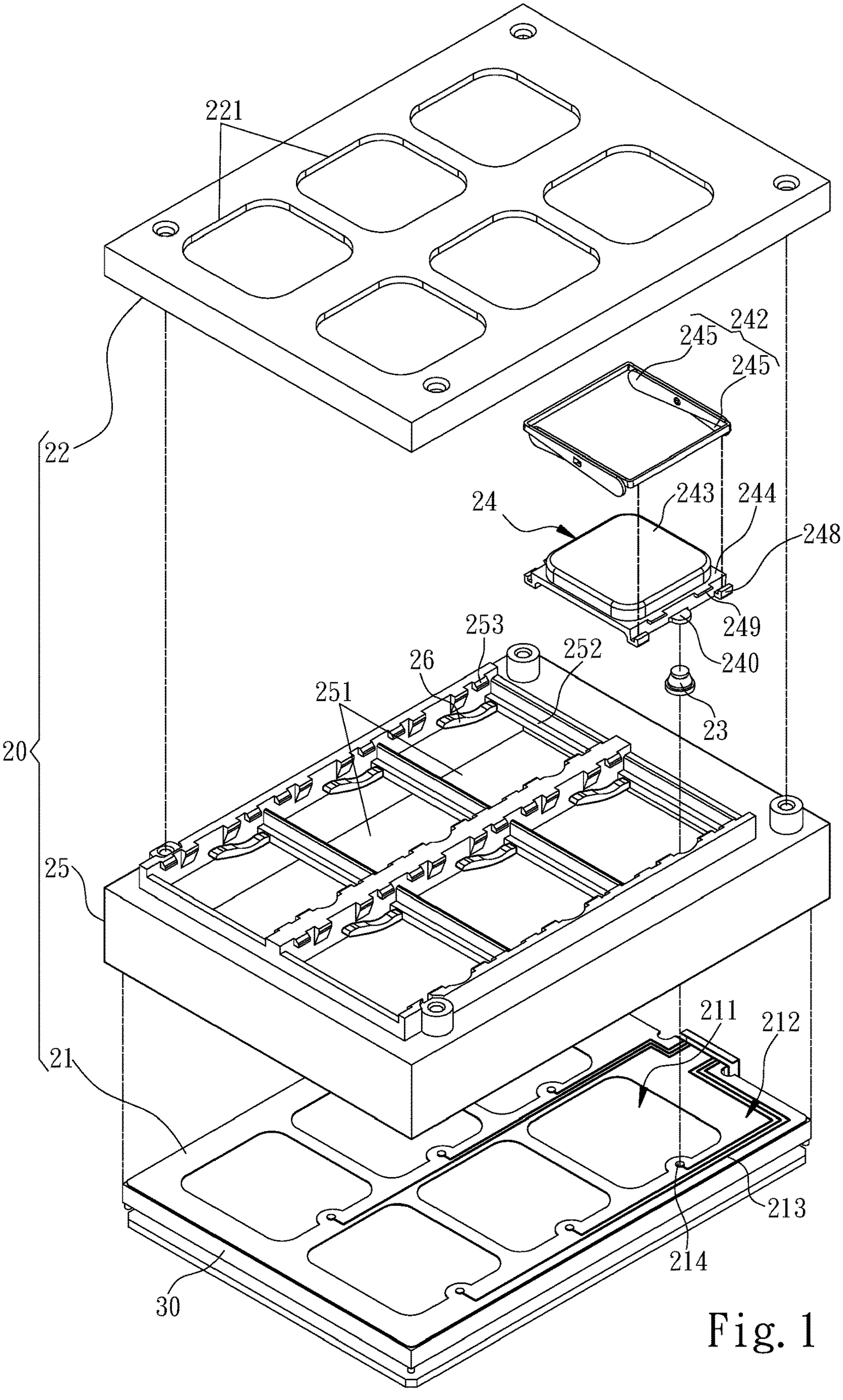
FIG. 1. is a first exploded perspective view of an embodiment of a key structure of the invention.
Figure 2:
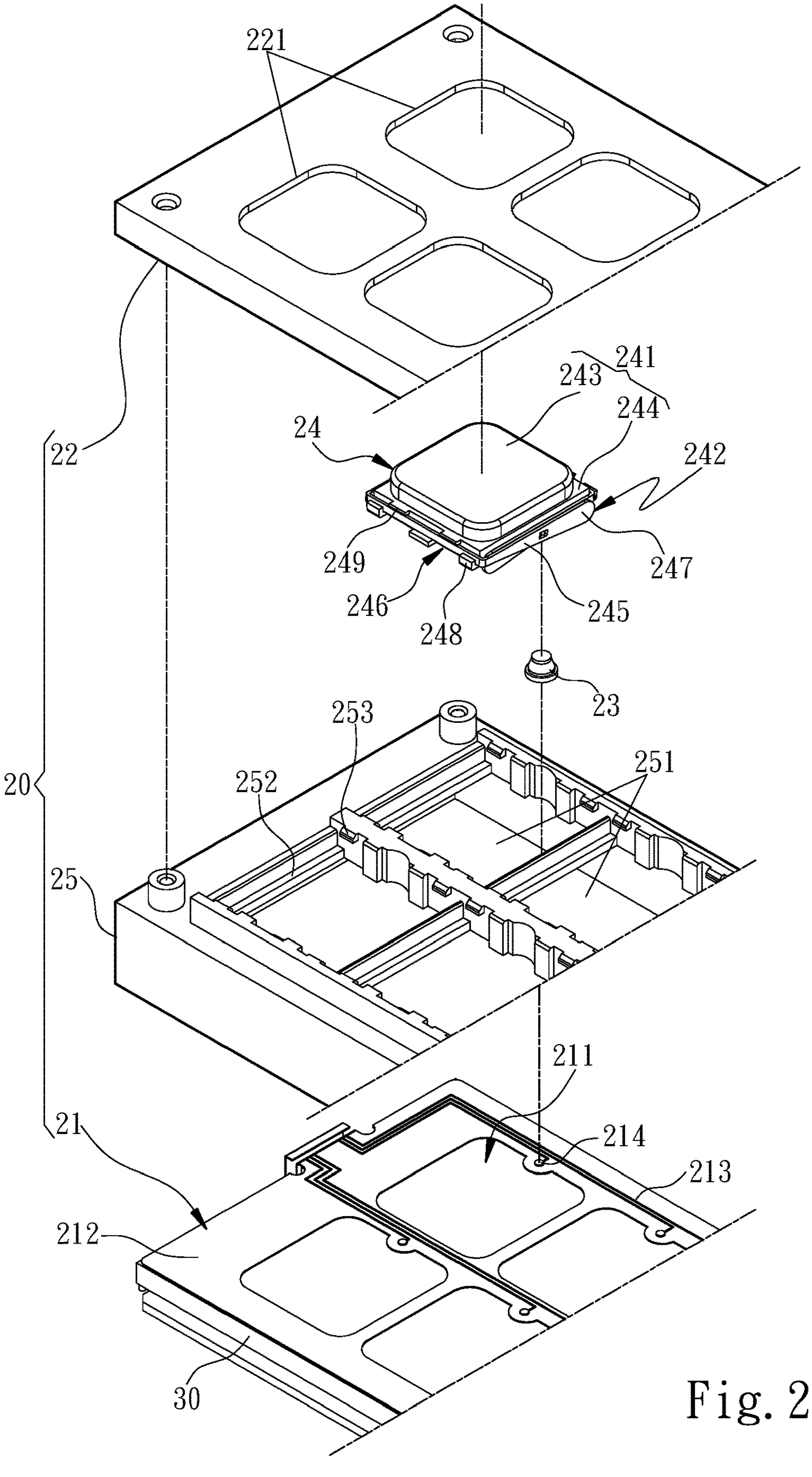
FIG. 2. is a second exploded perspective view of the embodiment of the key structure of the invention.
Figure 3:
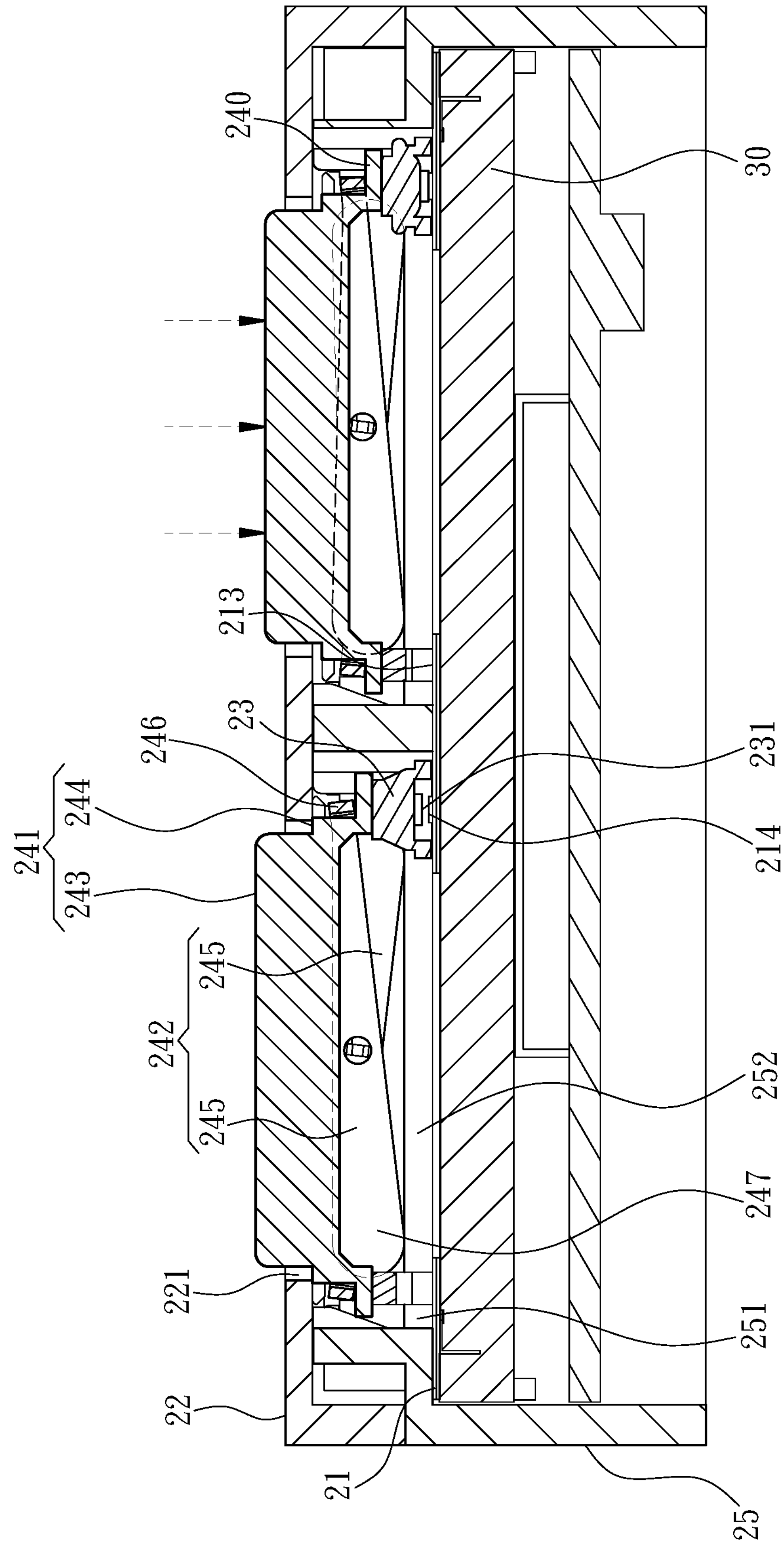
FIG. 3. is a sectional view of the embodiment of the key structure of the invention.
Figure 4:
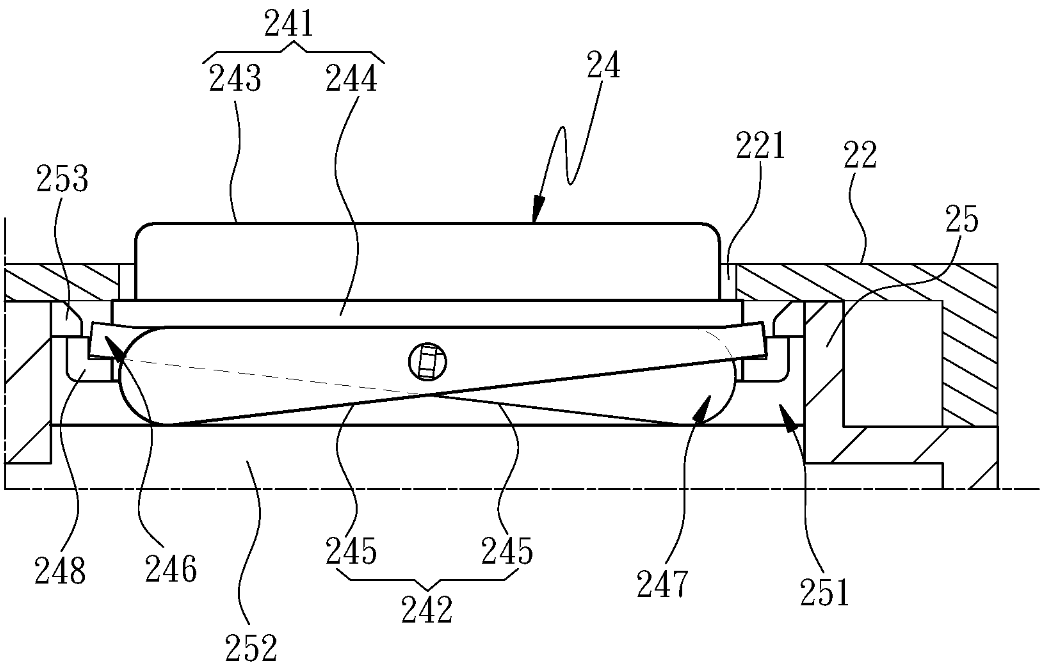
FIG. 4. is a schematic diagram of an unpressed key of the embodiment of the key structure of the invention.
Figure 5:
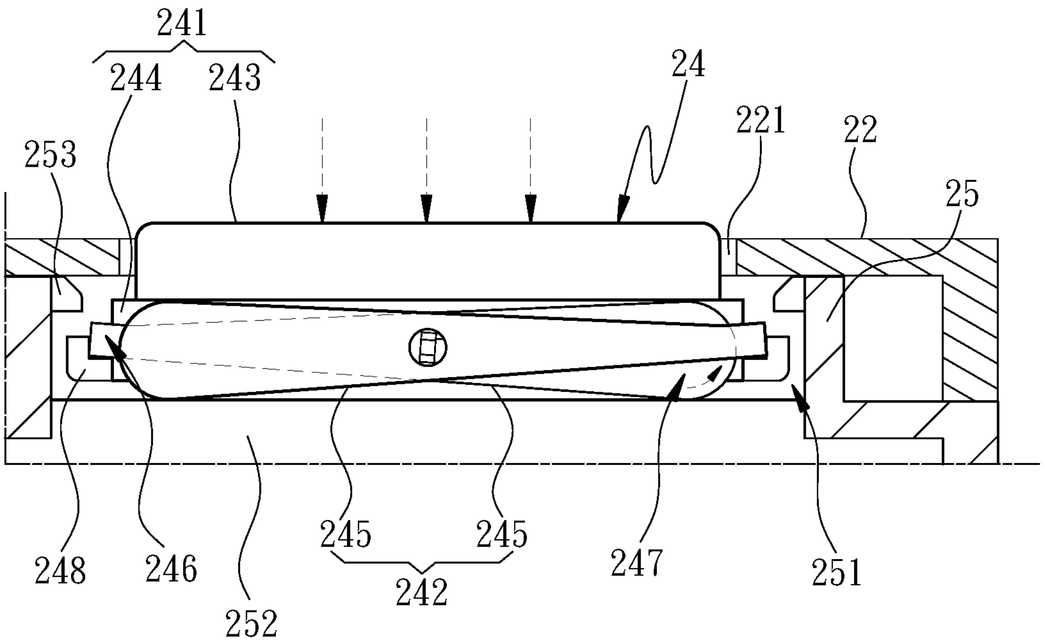
FIG. 5. is a schematic diagram of a pressed key of the embodiment of the key structure of the invention.
Figure 6:
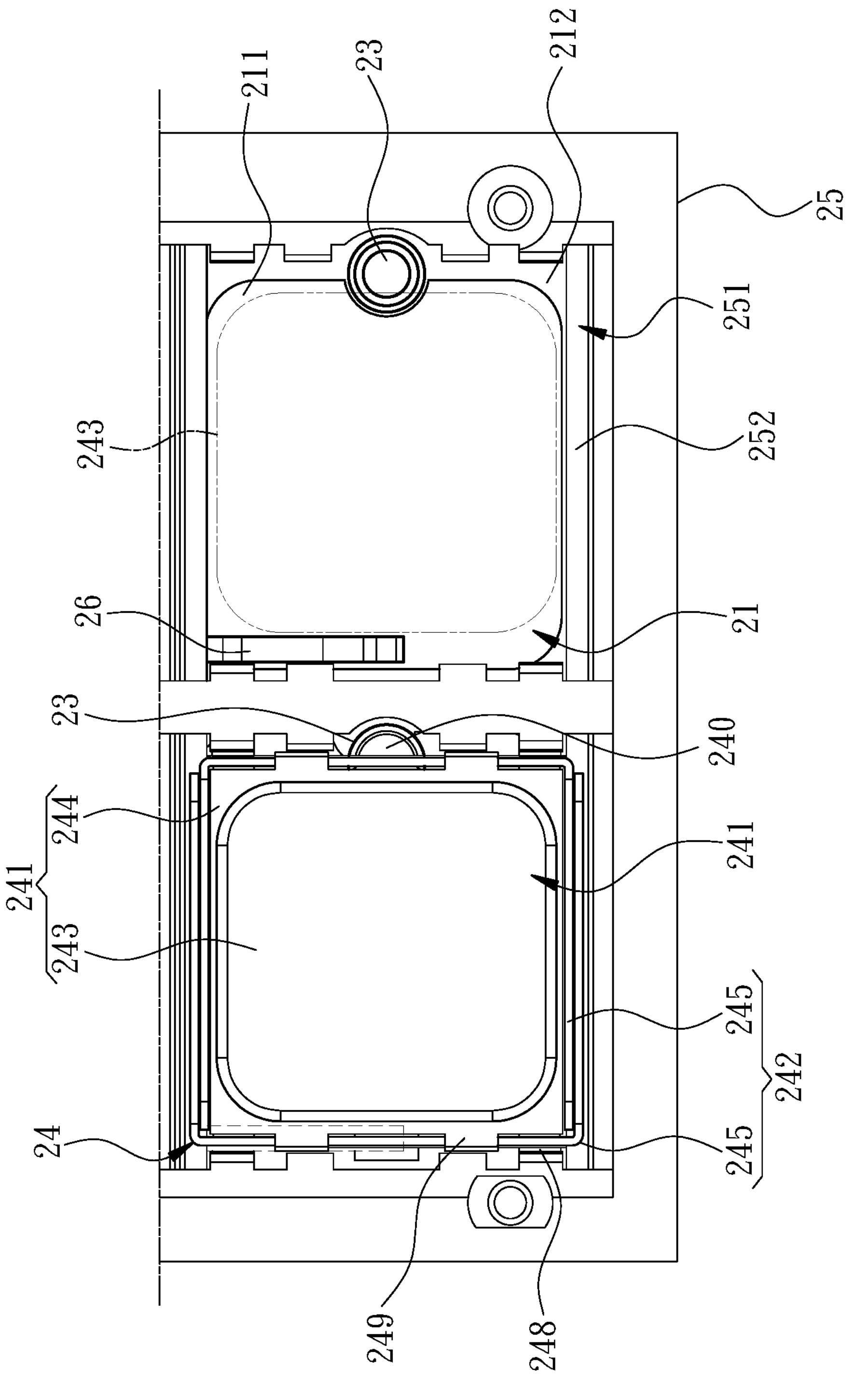
FIG. 6. is a top enlarged partial view of the embodiment of the key structure of the invention.

With reference to FIG. 1, FIG. 2, and FIG. 3, the invention provides a key structure 20. The key structure 20 is stacked on a display panel 30. At least one image displayed on the display panel 30 corresponding to the key structure 20 is an operation identification image of the key structure 20, so that when a user operates, the at least one image displayed on the display panel 30 will be used to understand a function correspondingly executed by an information device after the key structure 20 is pressed. The key structure 20 comprises a trigger plate 21, a frame 22, at least one elastic triggering member 23, and a key 24. The trigger plate 21 is formed with at least one hollow area 211, and a solid area 212 connected with the at least one hollow area 211. The at least one hollow area 211 exposes parts of the display panel 30. The trigger plate 21 includes at least one triggering circuit 213 in the solid area 212. The at least one triggering circuit 213 includes at least one first trigger point 214. A number of the at least one first trigger points 214 corresponds to a number of the at least one hollow areas 211. In one embodiment, the trigger plate 21 is implemented as a flexible printed circuit (FPC). In addition, the frame 22 is provided on the trigger plate 21, and the frame 22 is formed with at least one opening 221 corresponding to the at least one hollow area 211 after assembly. Specifically, the at least one hollow area 211 is located within the projection range of the at least one opening 221. In addition, the at least one elastic triggering member 23 is a force-deformable member. The at least one elastic triggering member 23 is provided on the solid area 212 and is provided corresponding to the first trigger point 214. When the at least one elastic triggering member 23 is pressed, the at least one triggering circuit 213 generates an electrical signal. In one embodiment, at least one elastic triggering member 23 used in conventional keyboard is implemented in the invention. The at least one elastic triggering member 23 includes a second trigger point 231 facing the first trigger point 214, the second trigger point 231 does not contact the first trigger point 214 when the at least one elastic triggering member 23 is not pressed. When the at least one elastic triggering member 23 is pressed, the second trigger point 231 contacts the first trigger point 214 due to the deformation of the at least one elastic triggering member 23, thereby causing the at least one triggering circuit 213 to generate an electrical signal.

With reference to FIG. 1, FIG. 2, FIG. 3, FIG. 4, and FIG. 5, the key 24 includes a key cap 241 and a scissor member 242 connected to the key cap 241. The key cap 241 compresses the at least one elastic triggering member 23. The key cap 241 includes a cap body 243 and at least two skirts 244 extending from the sides of the cap body 243. The at least two skirts 244 are located at two opposite sides of the cap body 243, but not limited thereto. In one embodiment, the key cap 241 is further provided with a plurality of skirts 244. Furthermore, the cap body 243 may be transparent or translucent. After the key structure 20 is assembled, the cap body 243 is located in the at least one opening 221 of the frame 22. A user directly observes the at least one hollow area 211 through the cap body 243. The at least two skirts 244 are separately shielded by the frame 22. The scissor member 242 provides support for movement of the key cap 241. The scissor member 242 includes two supports 245. In one embodiment, the two supports 245 are implemented as a frame. Each of the two supports 245 includes a fixed end 246 fixed to one of the at least two skirts 244 and a movable end 247 which is not fixed. The two supports 245 are staggered when assembled to create a scissor-like configuration. Further, the movable end 247 of each of the two supports 245 of the invention moves when the scissor member 242 is compressed by the key cap 241, that is, the movable end 247 of each of the two supports 245 is not fixed. Further, the two supports 245 are both slightly larger than the key cap 241 such that the key cap 241 does not interfere with the two supports 245 when pressed. In one embodiment, the movable end 247 of each of the two supports 245 is in a circular arc shape. Further, the movable end 247 of each of the two supports 245 is wider than the fixed end 246.

In comparison with the conventional technique, the invention provides the movable end 247 of the scissor member 242 which shortens a triggering stroke of the key 24, thereby making the overall key structure 20 thinner, and omitting a mounting base plate fixing the conventional scissor member in the conventional structure. Furthermore, the key structure 20 of the invention is identified by image displayed on the display panel 30. By disposing the fixed end 246 of the scissor member 242 on the at least two skirts 244 of the key cap 241, the whole of the scissor member 242 is out of projection range of the cap body 243 of the key cap 241 and does not affect visible range of the cap body 243, thereby providing a larger visible range than in the conventional technique. In addition, the invention avoids a significant distance between the key cap 241 and the display panel 30 because the invention is implemented with a short stroke. The invention reduces visual deviation when observing a pattern displayed on the display panel 30 through the key cap 241.

With reference to FIG. 1, FIG. 2, and FIG. 3, each of the at least two skirts 244 is formed with at least one snap hook 248 coupling the fixed end 246 of each of the two supports 245. In one embodiment, each of the at least two skirts 244 further defines at least one auxiliary limiting block 249. The at least one auxiliary limiting block 249 and the at least one snap hook 248 limits the fixed end 246 of each of the two supports 245 from disengaging. Further, in one embodiment, one of the at least two skirts 244 is formed with a pressing plate 240 pressing the at least one elastic triggering member 23.

With reference to FIG. 1, FIG. 2, FIG. 3, FIG. 4, FIG. 5, and FIG. 6, in one embodiment, the key structure 20 further comprises a base 25. The base 25 is stacked on the display panel 30 and assembled with the frame 22. The base 25 provides at least one accommodating space 251 in which the key 24 is arranged and operated. When the key structure 20 is assembled, the at least one hollow area 211 of the trigger plate 21 is located within the at least one accommodating space 251 from a top view of the key structure 20. The area of the at least one accommodating space 251 is significantly larger than the area of the at least one hollow area 211. In another embodiment, the base 25 is formed with at least two protruding walls 252 provided on two opposite sides of the at least one accommodating space 251. Edges of each of the two protruding walls 252 near the at least one hollow area 211 do not enter the range defined by the at least one hollow area 211. A portion of each the two protruding walls 252 facing the key cap 241 of the invention is a flat surface that the movable end 247 of each of the two supports 245 moves upward.

With reference to FIG. 1 and FIG. 3, in one embodiment, the key structure 20 includes a supporting arm 26 disposed in the at least one accommodating space 251. One end of the supporting arm 26 is connected to the base 25. Further, the supporting arm 26 is integrally formed with the base 25. In one embodiment, the supporting arm 26 contacts the key cap 241. The supporting arm 26 and the at least one elastic triggering member 23 provide a resetting force toward the key 24. More specifically, the supporting arm 26 extends below the key cap 241. The supporting arm 26 deforms when the key cap 241 is pressed and stores energy through deformation that returns the key 24. Furthermore, the supporting arm 26 and the at least one elastic triggering member 23 are respectively positioned at two opposite sides of the at least one accommodating space 251 so that the key cap 241 moves smoothly, and so that the user does not feel a significant difference in feedback feeling when touching different positions of the key cap 241.

With reference to FIG. 1 and FIG. 2, in one embodiment, the base 25 is formed with at least two stoppers 253 located on opposite walls of the at least one accommodating space 251. The base 25 directly forms the at least two stoppers 253. The at least two stoppers 253 restrict the key cap 241 from being separated from the at least one accommodating space 251.

Figure 7:
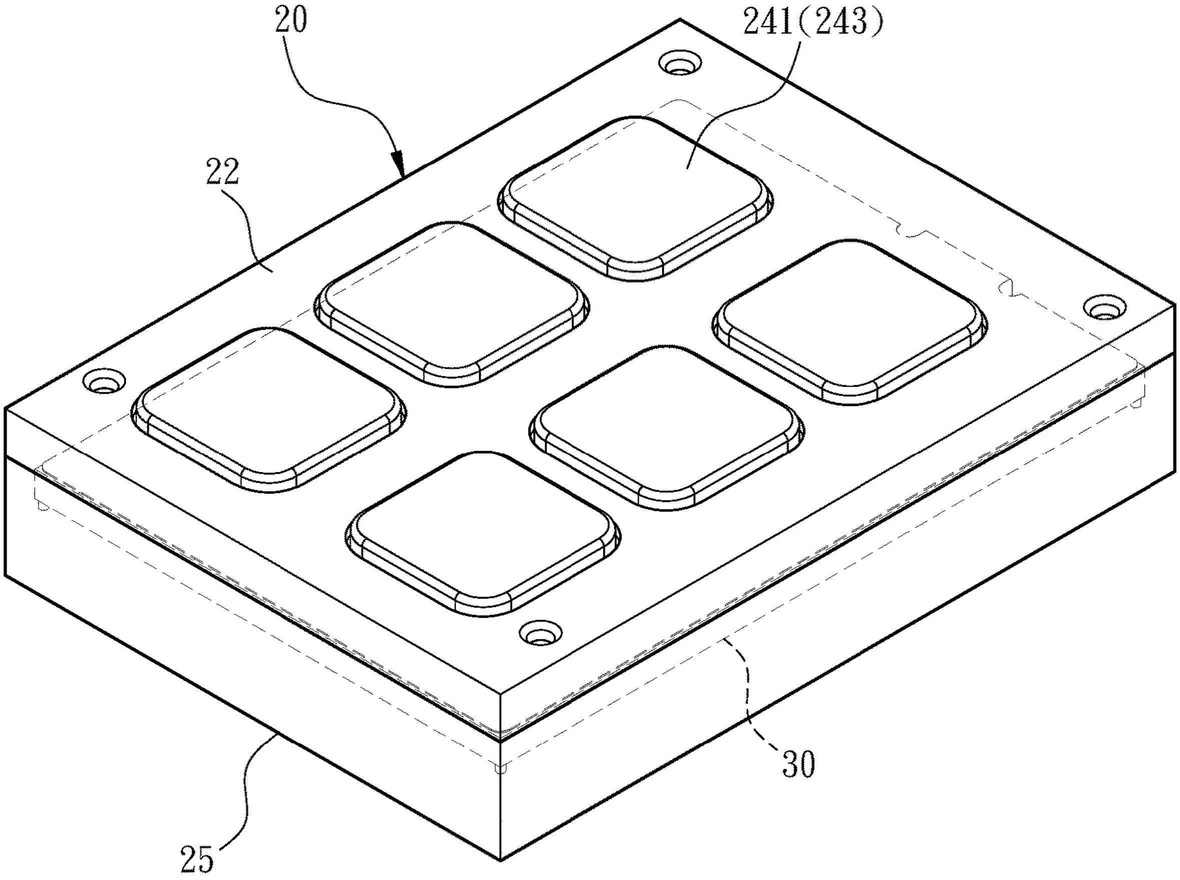
FIG. 7 is a schematic diagram of the embodiment of the key structure of the invention.

With reference to FIG. 7, in one embodiment, the base 25 further serves as a housing to place the display panel 30 and implementing components, so that the key structure 20 and the display panel 30 are assembled into a single device.

What is claimed is:

1. A key structure, stacked on a display panel, comprising:
- a trigger plate, formed with at least one hollow area and a solid area connected with the at least one hollow area, wherein the at least one hollow area exposes parts of the display panel, the trigger plate comprises at least one triggering circuit in the solid area;
- a frame, provided on the trigger plate and formed with at least one opening corresponding to the at least one hollow area;
- at least one elastic triggering member, provided on the solid area of the trigger plate, wherein when the at least one elastic triggering member is pressed, the at least one triggering circuit generates an electrical signal;
- a base, formed with at least one accommodating space and at least two protruding walls provided on two opposite sides of the at least one accommodating space; and
- at least one key, operated in the at least one accommodating space, and the at least one key comprising a key cap pressing the at least one elastic triggering member and a scissor member connected to the key cap, wherein the key cap comprises a cap body located in the at least one opening and at least two skirts extending from sides of the cap body and covered by the frame, the at least one hollow area is directly observed through the cap body, and wherein the scissor member comprises two supports, each of the two supports comprises a fixed end fixed to one of the at least two skirts and a movable end which is not fixed and is movable on the at least two protruding walls, and the movable end of each of the two supports moves when the scissor member is compressed by the key cap.

2. The key structure according to claim 1, wherein each of the at least two skirts is formed with at least one snap hook coupling the fixed end of each of the two supports.

3. The key structure according to claim 2, wherein each of the at least two skirts is formed with at least one auxiliary limiting block, the at least one auxiliary limiting block and the at least one snap hook limits disengagement of the fixed end.

4. The key structure according to claim 3, wherein one of the at least two skirts is formed with a pressing plate pressing the at least one elastic triggering member.

5. The key structure according to claim 1, wherein the movable end of each of the two supports is in a circular arc shape.

6. The key structure according to claim 1, wherein the key structure comprises a supporting arm provided in the at least one accommodating space, and the supporting arm contacts the key cap and provides a resetting force toward the key cap.

7. The key structure according to claim 6, wherein the supporting arm and the at least one elastic triggering member are respectively located at two opposite sides of the at least one accommodating space.

8. The key structure according to claim 7, wherein the supporting arm is integrally formed with the base.

9. The key structure according to claim 1, wherein the base is formed with at least two stoppers provided on two opposing inner walls of the at least one accommodating space, and the at least two stoppers restrict the key cap from being separated from the at least one accommodating space.

* * * * *